(12) United States Patent
Wang et al.

(10) Patent No.: US 11,329,486 B2
(45) Date of Patent: May 10, 2022

(54) METHOD FOR INITIATING FLEXIBLE DC TRANSMISSION SYSTEM UNDER ISOLATED ISLAND CONDITION

(71) Applicants: NR Electric Co., Ltd, Jiangsu (CN); NR Engineering Co., Ltd, Jiangsu (CN)

(72) Inventors: Ke Wang, Jiangsu (CN); Shunke Sui, Jiangsu (CN); Yu Lu, Jiangsu (CN); Yunlong Dong, Jiangsu (CN); Zhaoqing Hu, Jiangsu (CN); Gang Li, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 274 days.

(21) Appl. No.: 16/607,847

(22) PCT Filed: Apr. 27, 2018

(86) PCT No.: PCT/CN2018/084716
§ 371 (c)(1),
(2) Date: Oct. 24, 2019

(87) PCT Pub. No.: WO2018/196830
PCT Pub. Date: Nov. 1, 2018

(65) Prior Publication Data
US 2020/0195013 A1 Jun. 18, 2020

(30) Foreign Application Priority Data

Apr. 27, 2017 (CN) .......................... 201710286180.8

(51) Int. Cl.
*H02J 3/36* (2006.01)
*H02J 3/38* (2006.01)

(52) U.S. Cl.
CPC ................ *H02J 3/36* (2013.01); *H02J 3/388* (2020.01)

(58) Field of Classification Search
CPC ... H02J 3/36; H02J 3/388; H02M 1/36; Y02E 60/60
See application file for complete search history.

(56) References Cited

U.S. PATENT DOCUMENTS 10,218,180 B2  2/2019  Gupta et al.
2017/0331393 A1 11/2017  Whitehouse et al.
(Continued)

FOREIGN PATENT DOCUMENTS

CN  103647440 A  3/2014
CN  104134996 A  11/2014
(Continued)

OTHER PUBLICATIONS

Office Action dated Jan. 25, 2021 in Indian Application No. 201917043289.
(Continued)

*Primary Examiner* — Toan T Vu
*Assistant Examiner* — Thai H Tran
(74) *Attorney, Agent, or Firm* — Panitch Schwarze Belisario & Nadel LLP

(57) ABSTRACT

During initiation under an isolated island condition, the amplitude of a voltage reference wave output generated by a flexible DC transmission control and protection system is in a segmented mode, wherein a first segment of the reference wave amplitude begins at zero or a fixed value $U_x$ and rapidly increases to $U_a$ kV at a rate of a kV/s, avoiding a low output voltage reference wave and high error and harmonic content of a sampled voltage and current. A second segment increases to $U_b$ kV at a rate of β kV/s, a third segment increases to $U_c$ kV at a rate of γ kV/s, and the $N^{th}$ segment
(Continued)

increases to a rated voltage of $U_N$ kV at a rate of $\varepsilon$ kV/s, thereby achieving non-disturbance and shockless initiation of a flexible DC transmission system under an isolated island condition.

13 Claims, 4 Drawing Sheets

(56) References Cited

U.S. PATENT DOCUMENTS

| | | | |
|---|---|---|---|
| 2018/0109111 A1* | 4/2018 | Somani | H02J 13/0006 |
| 2018/0115164 A1 | 4/2018 | Gupta et al. | |

FOREIGN PATENT DOCUMENTS

| | | | |
|---|---|---|---|
| CN | 104485683 | A | 4/2015 |
| CN | 104578128 | A | 4/2015 |
| CN | 104821710 | A | 8/2015 |
| CN | 105743122 | A | 7/2016 |
| CN | 106451458 | A | 2/2017 |
| CN | 106953349 | A | 7/2017 |
| EP | 2871759 | A1 | 5/2015 |
| EP | 3026803 | A1 | 6/2016 |
| EP | 3070827 | A1 | 9/2016 |
| JP | H1014247 | A | 1/1998 |
| JP | H11289775 | A | 10/1999 |
| JP | 2000253582 | A | 9/2000 |
| JP | 2002034159 | A | 1/2002 |
| JP | 2009219905 | A | 10/2009 |
| WO | 2015090375 | A1 | 6/2015 |

OTHER PUBLICATIONS

Office Action dated Jan. 8, 2021 in Korean Application No. 10-2019-7031676.

Int'l Search Report dated Jul. 18, 2018 in Int'l Application No. PCT/2018/084716.

Oiii, "The Control Strategies Research for Flexible DC Transmission and Distribution System," Southwest Jiaotong University Doctoral Dissertation (2013).

Office Action dated Aug. 11, 2021 in European Application No. 18790888.4.

Chang et al., "Simulation Study of Control Strategy for Island Operation of Xiamen VSC-HVDC" Smart Grid, vol. 4, No. 3., Mar. 2016.

Office Action dated Mar. 7, 2019 iin Chinese Application No. 201710286180.8.

Decision of Grant dated Jul. 8, 2021 in Korean Application No. 1020197031676.

Dcision to Grant dated Apr. 13, 2021 in Japanese Application No. 2019558665.

* cited by examiner

METHOD FOR INITIATING FLEXIBLE DC TRANSMISSION SYSTEM UNDER ISOLATED ISLAND CONDITION

CROSS-REFERENCE TO RELATED APPLICATIONS

This application is a Section 371 of International Application No. PCT/CN2018/084716, filed Apr. 27, 2018, which was published in the Chinese language on Nov. 1, 2018, under International Publication No. WO2018/196830, which claims priority under 35 U.S.C. § 119(b) to Chinese Application No. 201710286180.8, filed Apr. 27, 2017, the disclosures of which are incorporated herein by reference in their entirety.

TECHNICAL FIELD

The present application relates to the technical field of flexible DC transmission of power systems, in particular to a method for initiating a flexible DC transmission system under an isolated island condition.

BACKGROUND

Flexible DC transmission uses a voltage source converter to independently and rapidly control the active power and reactive power of a control system, so as to improve the stability of the system, to control the frequency and voltage fluctuation of the system and to improve the steady-state performance of a grid-connected AC system.

There are numerous offshore islands in China, most AC grids in these islands are weak, and the power output is unstable. The flexible DC transmission has great advantages in the fields of distributed power-generation grid connection, isolated-island power supply, new-energy grid connection, urban-distribution network power supply, and so on. For this reason, the State Grid Corporation of China and the China Southern Power grid Corporation vigorously promote power grid construction in the offshore islands, wherein the State Grid Corporation of China has established the five-terminal flexible DC project in Zhoushan, Zhejiang Province, and the China Southern Power grid Corporation has established the three-terminal flexible DC project in Nanao, Guangdong Province. When no AC power supply is present in AC grid regions connected to flexible DC converter stations, the flexible DC converter stations need to initiate and operate in an isolated island mode. That is to say, the flexible DC converter stations need to initiate in the isolated island mode if not operating during the power loss of island AC grids. Methods for switching flexible DC systems to island control in the case of power loss of the AC grids during operation of the flexible DC systems have been expounded in most existing documents. For instance, Research on Switching Time Between AC-DC Parallel and Island Operation of VSC-HVDC Transmission System (Wen an, Shi Wenbo, Annual Conference of the Chinese Society of Electrical Engineering, 2014) introduces switching of a sending-end converter station from constant-active power control to constant-frequency control when the system is switched to island operation from AC-DC parallel operation, analyzes the influence of the switching duration of control strategies on the frequency of a sending-end system. Generalized Control Strategy for Grid-connected and Island Operation of VSC-HVDC System (Guan Minyuan, Zhang Jing, Power System Automation, 2015) introduces droop control of the frequency-active power of an AC side and droop control of the active power-DC voltage of a DC side, and puts forward a universal control strategy for grid-connected and island operation of a VSC-HVDC system. A control method during initiation under an isolated island condition is involved in none of the existing documents disclosed.

Therefore, it is necessary to seek out a method for non-disturbance and shockless initiation suitable for island control to realize passive initiation of flexible DC systems during the power loss of the island AC grids.

SUMMARY

The objective of the present application is to overcome shortcomings of the prior art by providing a method for initiating a flexible DC transmission system under an isolated island condition. The method can avoid large disturbances and big shocks during initiation under an isolated island condition and can effectively inhibit high-frequency components and distortions of output voltages and currents in an initial segment of zero-voltage initiation, thereby guaranteeing stable operation of the system.

The technical solution adopted by the present application to fulfill the above-mentioned objective is as follows:

A method for initiating a flexible DC transmission system under an isolated island condition is implemented as follows: in an isolated island control mode, zero-voltage initiation is performed through open-loop control first, and then dual closed-loop control is adopted; or the dual closed-loop control is adopted directly; with regard to the dual closed-loop control, an outer loop controls the amplitude and frequency of an output voltage, and an inner loop controls an output current, so that a steady-state voltage is obtained; the amplitude of a voltage reference wave generated by a flexible DC control system is in a segmented mode and is divided into at least two segments, wherein a first segment of a reference wave amplitude begins at zero or a fixed value $U_x$ and rapidly increases to $U_a$ kV at a rate of $\alpha$ kV/s, latter segments of the reference wave amplitude increase at identical or different rates which are not greater than the rate $\alpha$ of the first segment, and the last segment of the reference wave amplitude finally increases to a rated voltage of $U_N$ kV, so that non-disturbance and shockless initiation of a flexible DC transmission system under an isolated island condition is fulfilled; wherein an initial value of a reference wave meets $U_x \leq 0.4$ p.u, and the rate of the first segment meets $\alpha \geq 2.0$ p.u/s. After the voltage increases to $U_a$ in a first segment, $U_a$ is used as an initial value of the voltage reference wave in a second segment; after the voltage increases to $U_b$ in the second segment, $U_b$ is used as an initial value of the reference wave in a third segment; and $U_x \leq U_a \leq U_b \leq \ldots \leq U_N$, and 1.0 p.u=$U_N$ kV.

According to the method for initiating a flexible DC transmission system under an isolated island condition, a voltage increase rate in the first segment is greater than or equal to a voltage increase rate in the second segment, the third segment, and the $N^{th}$ segment, namely $\alpha \geq \beta \geq 0$, $\alpha \geq \gamma \geq 0$, $\alpha \geq \varepsilon \geq 0$ kV/s; and meanwhile, as required, $\alpha \geq 2.0$ p.u/s, and 1.0 p.u=$U_N$ kV. $\beta$ is the voltage increase rate in the second segment, $\gamma$ is the voltage increase rate in the third segment, and $\varepsilon$ is the voltage increase rate in the $N^{th}$ segment.

According to the method for initiating a flexible DC transmission system under an isolated island condition, an initial value of a reference wave of a control and protection system meets $u_{ref1} \leq 0.4$ p.u, namely an initial voltage meets $U_x \leq 0.4$ p.u, and 1.0 p.u=$U_N$ kV, so that a transformer has a low excitation surge current when charged in an initial segment to prevent protection malfunction.

According to the method for initiating a flexible DC transmission system under an isolated island condition, the number of the segments of a voltage reference wave output meets N≥2.

According to the method for initiating a flexible DC transmission system under an isolated island condition, during zero-voltage initiation, on-load initiation or off-load initiation is fulfilled.

By adopting the above-mentioned solution, the present application has the following beneficial effects:

(1) The method for initiating a flexible DC transmission system under an isolated island condition of the present application avoids shocks and disturbances during initiation under the isolated island condition;

(2) The method for initiating a flexible DC transmission system under an isolated island condition of the present application avoids high-frequency components and distortions in the initial segment during the initiation under the isolated island condition; and (3) The method for initiating a flexible DC transmission system under an isolated island condition of the present application realizes passive initiation of flexible DC systems during power loss of island AC grids.

DETAILED DESCRIPTION OF EMBODIMENTS

Figure 1:
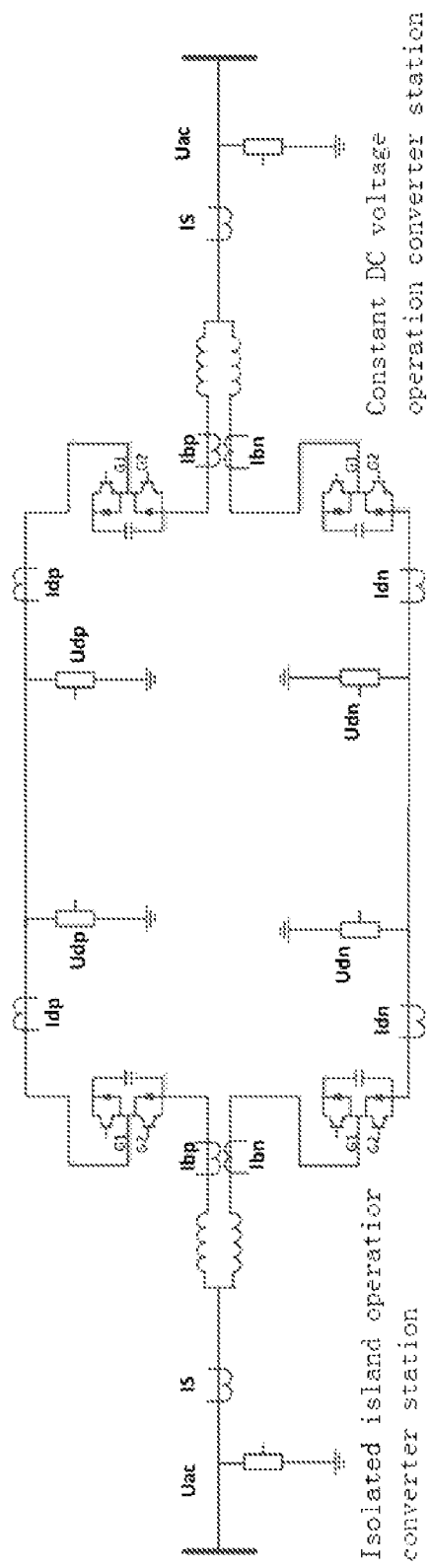
FIG. 1 is a diagram of a flexible DC transmission system having two ends.
Figure 2:
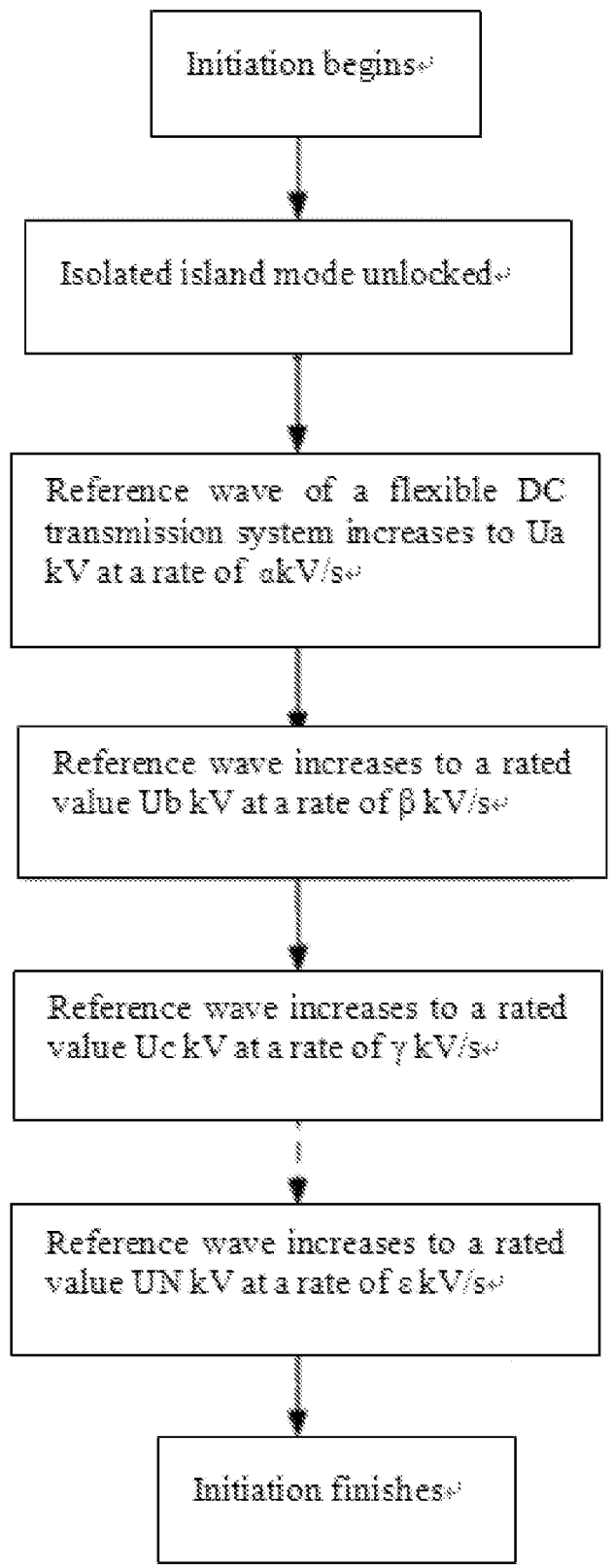
FIG. 2 is a flowchart of initiation performed through closed-loop control under an isolated island condition.

The technical solution of the present application is expounded as follows in combination of the accompanying drawings and embodiments. A flexible DC transmission system shown in FIG. 1 is initiated under an isolated island condition through steps shown in FIG. 2, and a reference wave output during initiation under an isolated island condition includes two segments, namely N=2.

(1) After a converter station is unlocked in an isolated island mode, a voltage reference wave is initiated from 0 kv, and meanwhile, a rated voltage is assumed to 119.5 kV; and when an output voltage reference wave is too small, the error and harmonic content of a sampled voltage and current are prevented from being too high, which may otherwise cause an adverse effect on a control system;

(2) A first segment is initiated, wherein in this segment an increase rate of a voltage reference wave amplitude is set as 1195 kV/s, and α=1195;

(3) When an effective voltage output value is 23.9 kV, a second segment is initialized, wherein in this segment, the increase rate is converted from 1195 kV/s to 5.975 kV/s, and β=5.975; and (4) The effective voltage output value slowly increases to the rated voltage of 119.5 kV from 23.9 kV.

Figure 3:
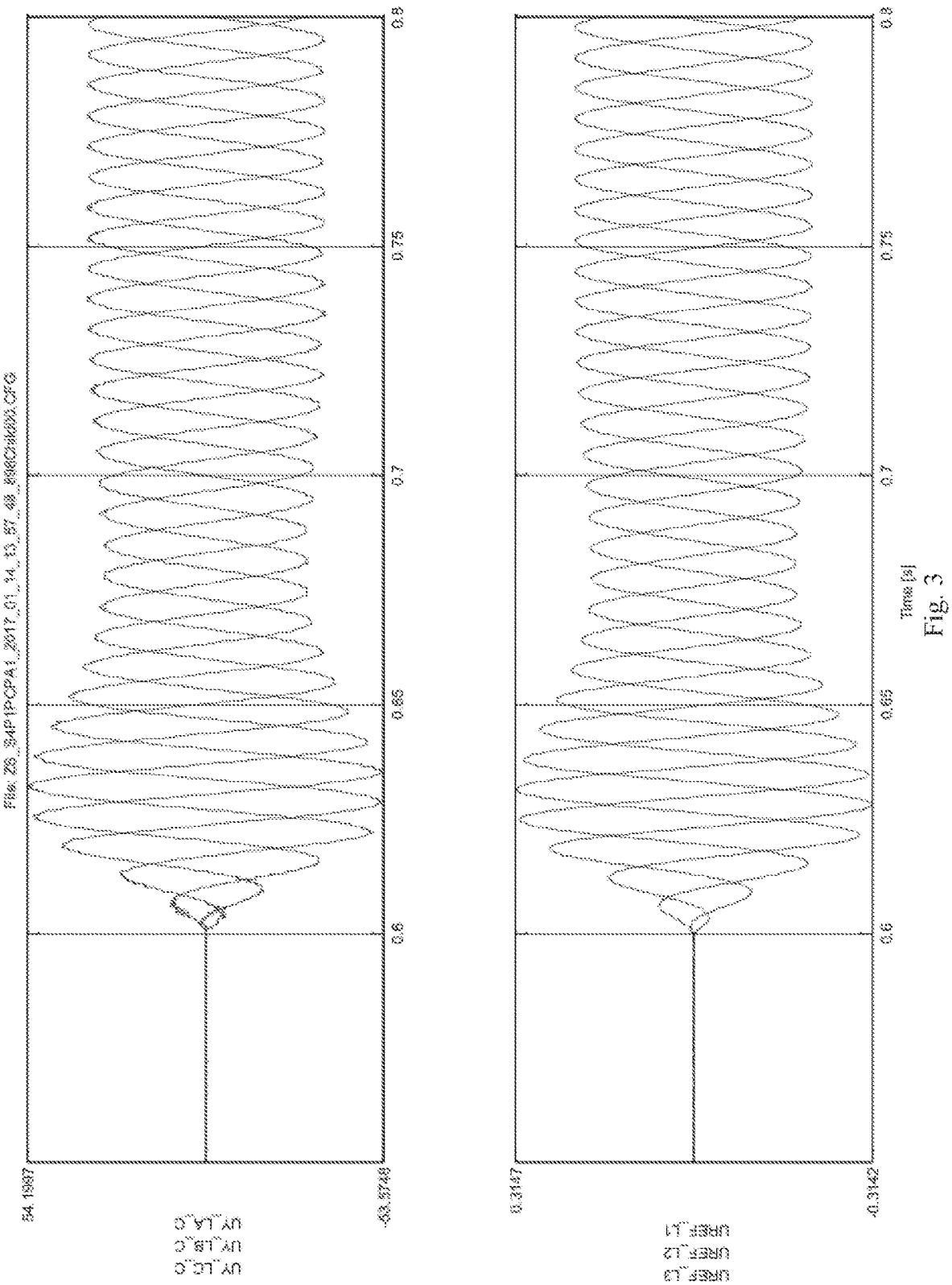
FIG. 3 is an initiation waveform obtained through a method for initiation under an isolated island condition of the present application.
Figure 4:
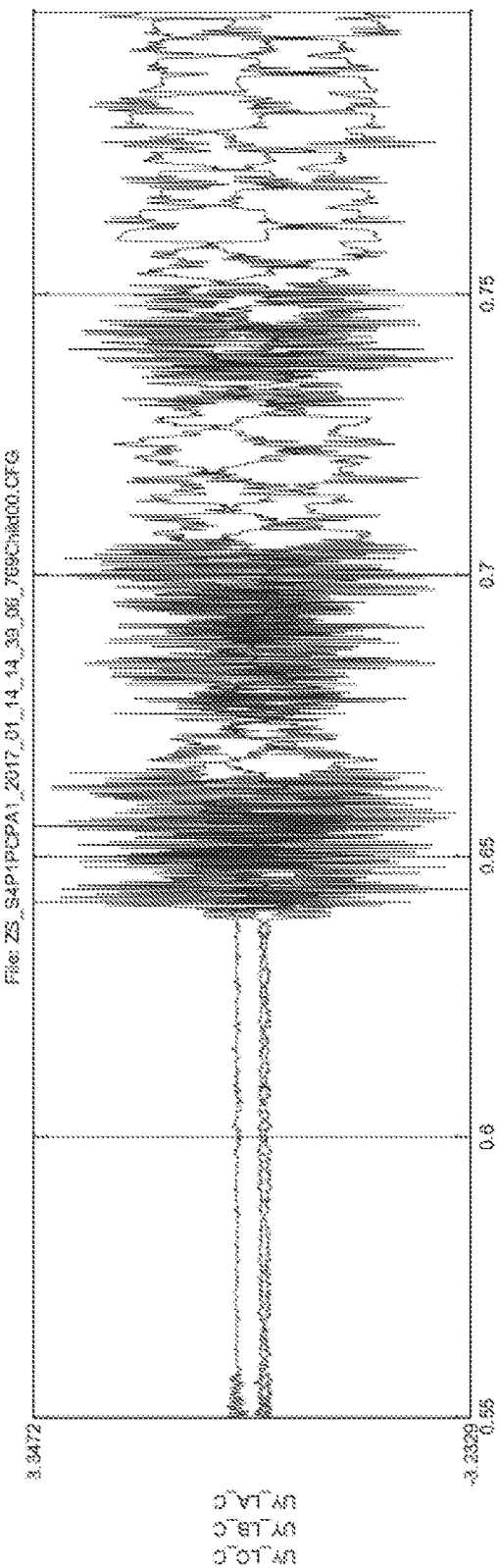
FIG. 4 is an initiation waveform of a voltage amplitude, increasing from 0 at a rate of 5.975 kV/s, of a reference wave during the initiation under the isolated island condition.
Figure 4:
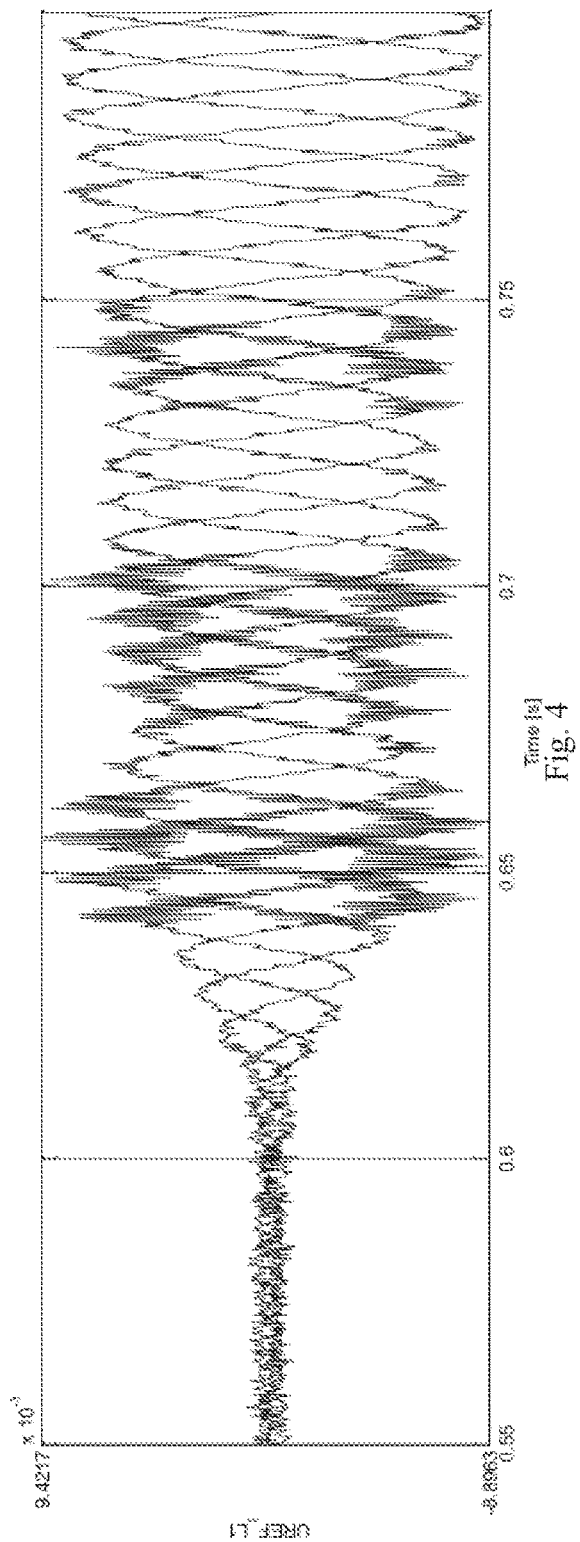

FIG. 3 shows a waveform obtained when a method for initiation under an isolated island condition of the present application is adopted; FIG. 4 shows an initiation waveform obtained when the method for initiation under an isolated island condition is not adopted and the effective voltage output value directly increases at the rate of 5.975 kV/s. In FIG. 3 and FIG. 4, UREF_L1, UREF_L2, and UREF_L3 represent three reference waves A, B, and C, UY_LA_C, UY_LB_C, and UY_LA_C represent actual voltages generated according to the reference waves, and clearly, the waveform obtained when the method for initiation under an isolated island condition of the present application is adopted is smooth and shockless.

The above embodiments are only used for explaining the technical idea of the present application, and are not used for limiting the protection scope of the present application. All changes made on the basis of the technical solution according to the technical idea put forward by the present application should also fall within the protection scope of the present application.

What is claimed is:

1. A method for initiating a flexible DC transmission system under an isolated island condition, comprising:
   in an isolated island control mode, carrying out segmented control on a voltage amplitude of a flexible DC transmission system to enable the voltage amplitude to reach a steady-state rated voltage $U_N$ from 0 or a fixed value $U_x$ in a dual closed-loop manner to realize initiation under the isolated island condition, wherein N≥2 the segmented control includes at least a first control segment and a last control segment;
   in the first control segment, the voltage amplitude of the flexible DC transmission system is controlled to increase to a voltage amplitude $U_a$ of the first control segment from 0 or the fixed value $U_x$ at a first rate α; and
   in the last control segment, the voltage amplitude of the flexible DC transmission system is controlled to increase to the rated voltage $U_N$,
   wherein in each control segment except for the first control segment, the voltage amplitude is controlled to increase at a corresponding rate which is greater than or equal to 0 and is smaller than or equal to the first rate α.

2. The method of claim 1, wherein the segmented control further includes:
   a second control segment in which the voltage amplitude of the flexible DC transmission system is controlled to increase to a voltage amplitude $U_b$ of the second control segment from the voltage amplitude $U_a$ of the first control segment;
   a third control segment in which the voltage amplitude of the flexible DC transmission system is controlled to increase to a voltage amplitude $U_c$ of the third control segment from the voltage amplitude $U_b$ of the second control segment;
   a $(N-1)^{th}$ control segment in which the voltage amplitude of the flexible DC transmission system is controlled to increase to a voltage amplitude $U_{N-1}$ of the $(N-1)^{th}$ control segment from a voltage amplitude $U_{N-2}$ of an $(N-2)^{th}$ control segment,
   wherein N≥5.

3. The method of claim 1, wherein the voltage amplitude in each control segment is smaller than the voltage amplitude in a next segment.

4. The method of claim 1, wherein the fixed value meets $U_x \leq 0.4$ p·u, and p·u is a per-unit value, the rated voltage meets $U_N=1.0$ p·u, and the first rate meets α≥2.0 p·u/s.

5. The method of claim 1, wherein
   the dual closed-loop manner includes inner-loop control and outer-loop control;

in the inner-loop control, an output current is controlled; and in the outer-loop control, a voltage amplitude and frequency of the flexible DC transmission system are controlled.

6. The method of claim 1, wherein in the first control segment, a relation between a magnetic flux$^{\Phi_i}$ of a transformer of the flexible DC transmission system and a voltage of the of the flexible DC transmission system meets the following formula:

$$\phi_i = -\frac{\sqrt{2}\,U_x}{N\omega}\cos(\omega t + \alpha) + \frac{\sqrt{2}\,U_x}{N\omega}\cos\alpha;$$

a rated magnetic flux meets $$\phi_N = \frac{\sqrt{2}\,U_N}{N\omega};$$

at a moment of passive initiation, if $\alpha=0$, the following formula is met:

$$\phi_i = -\frac{\sqrt{2}\,U_x}{N\omega}\cos(\omega t) + \frac{\sqrt{2}\,U_x}{N\omega};$$

and if $U_x \leq 0.5 U_N$, a maximum magnetic flux generated does not exceed the rated magnetic flux.

7. The method of claim 1, wherein the initiation under the isolated island condition comprises on-load initiation and/or off-load initiation.

8. The method of claim 1, further comprising:

in the isolated island control mode, carrying out zero-voltage initiation through open-loop control to control the voltage amplitude of the flexible DC transmission system to increase to the fixed value $U_x$ from 0.

9. An electronic device, comprising a memory, a processor, and a computer program which is stored in the memory and is able to run in the processor, wherein when the program is executed by the processor, the processor implements the method of claim 1.

10. A method for initiating a flexible DC transmission system under an isolated island condition, being implemented as follows: in an isolated island control mode, zero-voltage initiation is performed through open-loop control first, and then dual closed-loop control is adopted; or the dual closed-loop control is adopted directly; with regard to the dual closed-loop control, an outer loop controls an amplitude and frequency of an output voltage, and an inner loop controls an output current, so that a steady-state voltage is obtained; wherein an amplitude of a voltage reference wave generated by a flexible DC control system is in a segmented mode and is divided into at least two segments; a first segment of the amplitude of the voltage reference wave begins at zero or a fixed value $U_x$ kV and increases to $U_a$ kV at a rate of $\alpha$ kV/s, and a last segment of the amplitude of the voltage reference wave increases to a rated voltage of $U_N$ kV;

wherein, an initial value of the voltage reference wave meets $U_x \leq 0.4$p.u, and the rate of the first segment meets $\alpha \geq 2.0$p.u/s; and after the voltage increases to $U_a$ kV in a first segment, $U_a$ kV is used as an initial value of the voltage reference wave in a second segment; after the voltage increases to $U_b$ kV in the second segment, $U_b$ kV is used as an initial value of the reference wave in a third segment; and $U_x \leq U_a \leq U_b \leq U_N$, and $U_N$ kV=1.0p.u, wherein in an initial segment of initiation under an isolated island condition, a relation between a magnetic flux$^{\Phi_i}$ and the voltage of the transformer meets the following formula:

$$\phi_i = -\frac{\sqrt{2}\,U_x}{N\omega}\cos(\omega t + \alpha) + \frac{\sqrt{2}\,U_x}{N\omega}\cos\alpha;$$

a rated magnetic flux meets:

$$\phi_N = \frac{\sqrt{2}\,U_N}{N\omega}$$

at a moment of passive initiation, if $\alpha=0$, the following formula is met:

$$\phi_i = -\frac{\sqrt{2}\,U_x}{N\omega}\cos(\omega t) + \frac{\sqrt{2}\,U_x}{N\omega};$$

and if $U_x \leq 0.5 U_N$, a maximum magnetic flux generated does not exceed the rated magnetic flux.

11. The method of claim 10, wherein a voltage increase rate in the first segment is greater than or equal to a voltage increase rate in the second segment, the third segment, and an $N^{th}$ segment, namely $\alpha \geq \beta \geq 0$, $\alpha \geq \gamma \geq 0$, $\alpha \geq \varepsilon \geq 0$ kV/s, $\beta$ is the voltage increase rate in the second segment, $\gamma$ is the voltage increase rate in the third segment, and $\varepsilon$ is the voltage increase rate in the $N^{th}$ segment.

12. The method of claim 10, wherein the number of the segments of a voltage reference wave output meets $N \geq 2$.

13. The method of claim 10, wherein during initiation under an isolated island condition, on-load initiation or off-load initiation is fulfilled.

* * * * *